April 15, 1969      W. V. GILPIN      3,438,397
PRESSURE TEST PLUG AND MEANS FOR BYPASSING GAS METERS
Filed Oct. 20, 1965      Sheet _1_ of 2
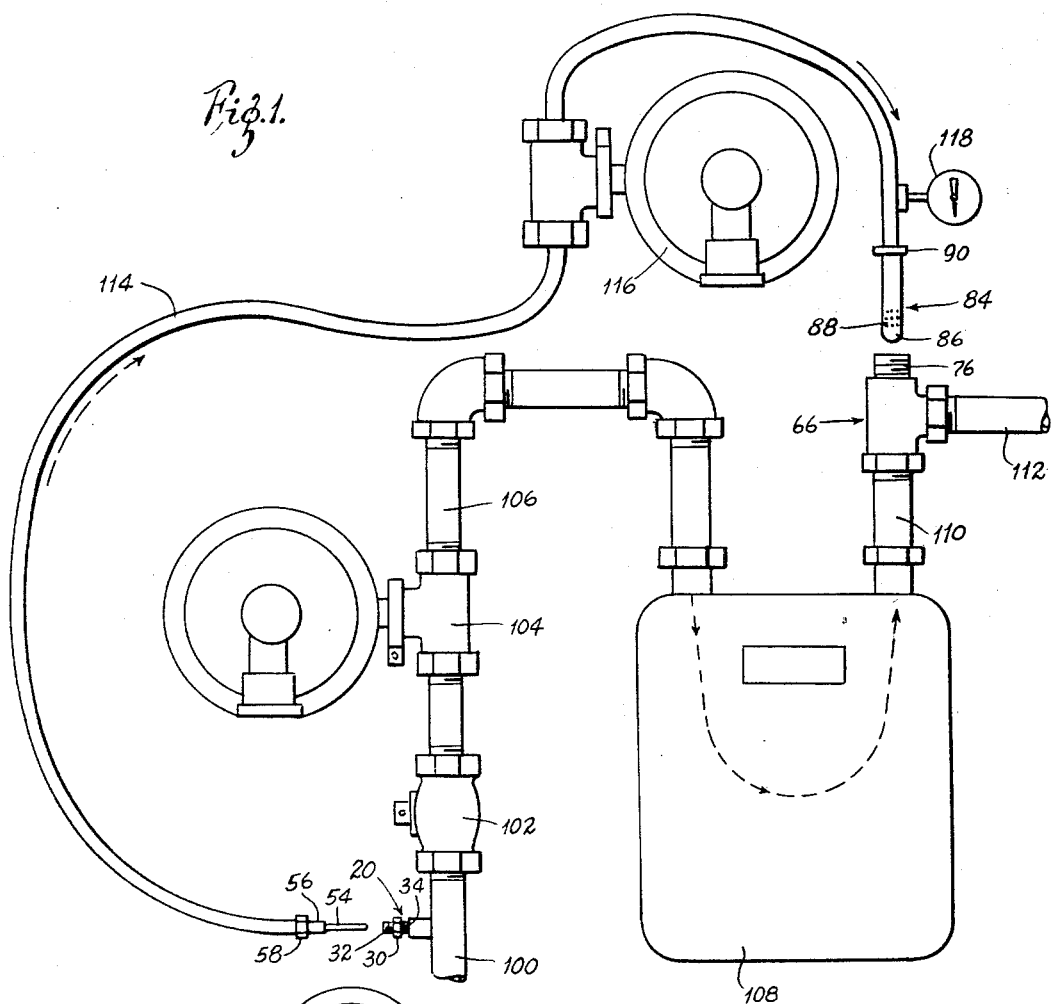
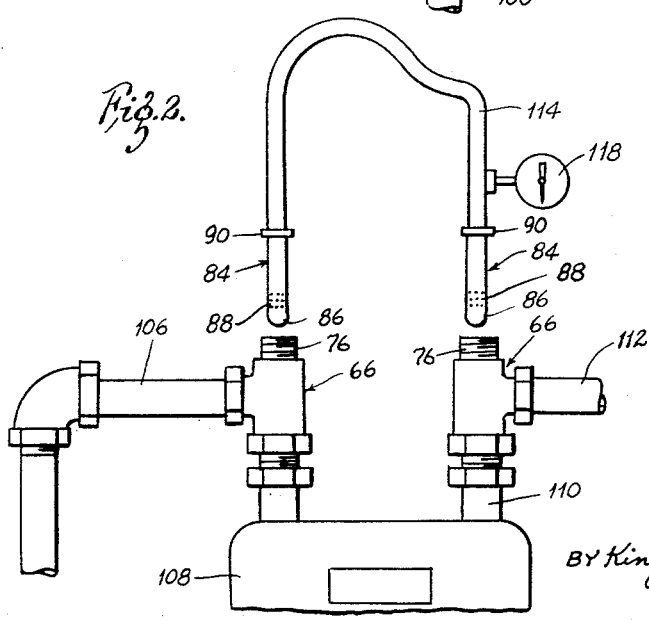
INVENTOR:
WILLIAM V. GILPIN,
BY Kingsland, Rogers, Ezell, Eilers & Robbins
ATTORNEYS April 15, 1969     W. V. GILPIN     3,438,397
PRESSURE TEST PLUG AND MEANS FOR BYPASSING GAS METERS
Filed Oct. 20, 1965
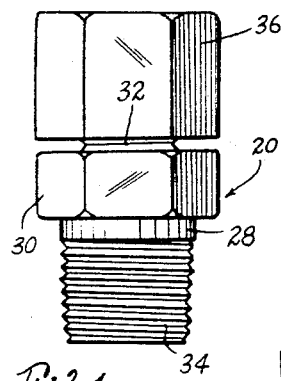
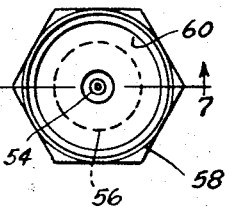
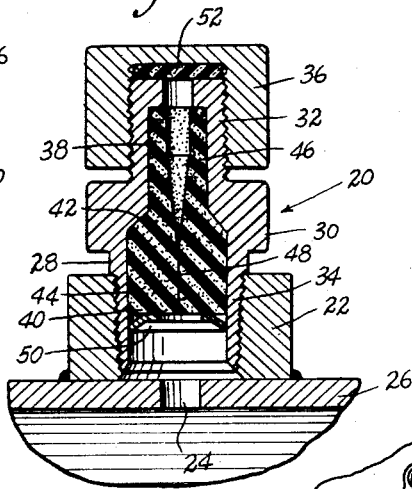
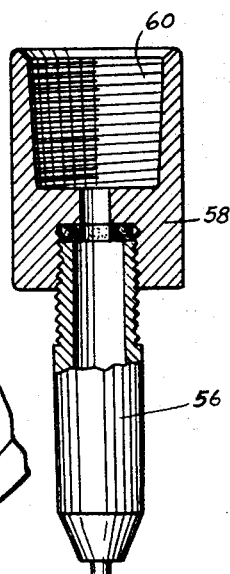
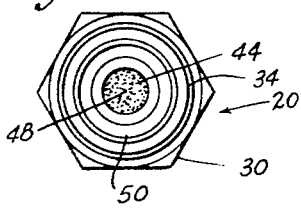
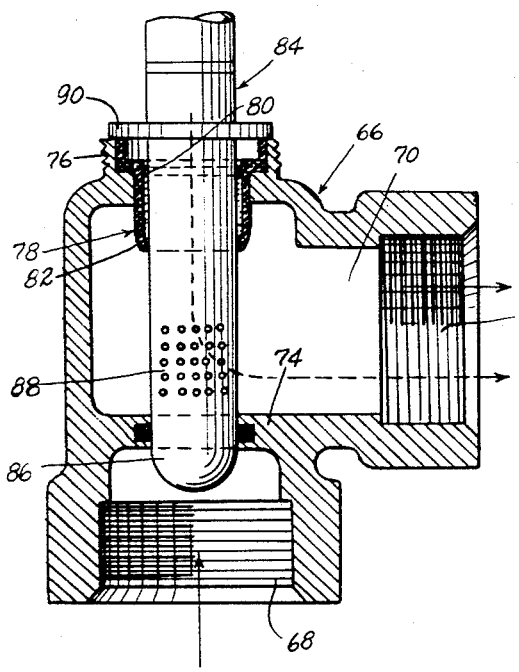
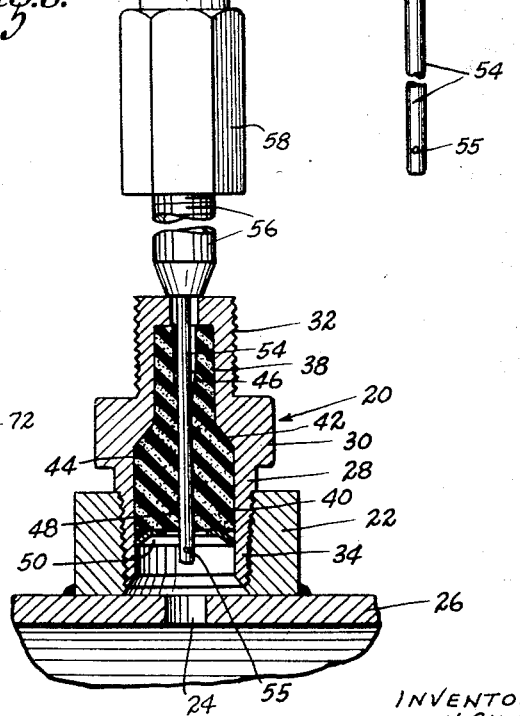
INVENTOR:
WILLIAM V. GILPIN,
BY Kingsland, Rogers, Ezell, Eilers & Robbins
ATTORNEYS

United States Patent Office 3,438,397
Patented Apr. 15, 1969

3,438,397
PRESSURE TEST PLUG AND MEANS FOR
BYPASSING GAS METERS
William V. Gilpin, Albuquerque, N. Mex., assignor to Universal Controls Corporation, Dallas, Tex., a corporation of Texas
Filed Oct. 20, 1965, Ser. No. 498,357
Int. Cl. E03b 7/09; F16k 43/00
U.S. Cl. 137—599        10 Claims

ABSTRACT OF THE DISCLOSURE

A device for bypassing a gas meter to prevent interruption in service including a bypass conduit having a high pressure needle at one end and a low pressure needle at the other end to pierce resilient coupling seals located in the main gas line upstream and downstream of the gas meter to close off flow through the gas meter and establish flow through the bypass conduit. A coupling fitting is provided having a resilient core with a slit pressed closed by an adjustable lock member and tapered shoulder for sealingly receiving a pressure gauge insertion needle.

---

This invention relates to improvements in gas pressure test plug mechanisms and in particular is concerned with a valve in a plug, using a tubular probe or needle and a resilient valve for taking the pressure of gas or other fluids, and means for bypassing gas meters by use of a similar probe and valve.

In the past it has been a custom to take pressure readings by means of a pressure gauge, or the like, permanently connected into a gas pressure line. Such installations require the use of a permanent gauge with the consequent danger of theft, breakage, maintenance, and high capital investment. By means of this invention, there has been provided a unique pressure plug using a diametrically and longitudinally compressible pressure plug connected to the gas line and through which a tubular needle probe connected to a gas pressure gauge may be inserted. The needle probe and the gas gauge can be connected together as a unit, and taken from one pressure plug location to another, as desired.

By means of the aforementioned pressure test plug, pressure readings may be quickly taken employing only a single pressure gauge and probe, which may be rapidly employed in any number of the pressure test plugs provided through this invention. Likewise, it will be understood that the pressure test plug may be employed for evacuation or sampling of the contents of the gas, or other fluid, pressure line, or may be employed for the addition of material to a pressured line by pumping through the plug. The plug will be provided with a cap when not in use to protect the threads, insure against any possible leakage, and to prevent the resilient pressure plug from being tampered with or damaged.

It has been further a problem in the past to provide for the change-out of meters for checking, for repair, or replacement. Conventionally for the taking of a meter out of service the serviceman must shut off all gas burning appliances before the meter is removed for the substitution of a new one. After this operation, relighting of all of the pilot lights and checking of the gas burning equipment is required. Such equipment that does provide for in-service bypassing has been complicated and expensive, and difficult to handle. By means of this invention, there has been provided bypass systems whereby a gas meter may be bypassed simply and efficiently. In the bypass system, if a high pressure line is employed feeding into the gas regulator and meter, the probe needle valve of the type before mentioned is connected into the high pressure test plug provided in the high pressure inlet side of the gas line or cock, while a low pressure insertion probe valve is connected into a special fitting on the outlet side of the gas meter, which simultaneously closes off communication between the gas meter and the house service line and opens the bypass communication. The bypass line employed in the case of a high pressure inlet may use a conventional gas pressure regulator, which is part of the bypass communication system, and a gas pressure gauge may also be included. Where the inlet line to the gas meter is a low pressure line, a low pressure insertion probe valve may be employed with a fitting of the same type provided on the outlet line, and the gas pressure regulator may be eliminated.

Further, by use of the bypass system, the gas service may be maintained in usage while the meter is being changed. The time of the serviceman and his truck is greatly conserved in eliminating the necessity of entering the residence to turn off all appliances before the meter is taken out, as in the conventional practice, and relighting and rechecking the gas appliances after the new meter is installed. Needles to say, the convenience to the homeowner or the user is greatly improved. The probe and valve plug and the bypass system of this invention are very simply employed and represent a small capital cost that can be enjoyed without any necessity of rigorous training or the like. Further, the gas pressure plug and the bypass mechanism are rugged in construction and designed to minimize maintenance and damage in use.

The above features are objects of this invention and further objects will appear in the detailed description which follows, and will be otherwise apparent to those skilled in the art.

For the purpose of illustration of this invention, a preferred embodiment of the gas pressure test plug and bypass systems for use in both high pressure and low pressure inlet lines to a gas meter are shown. It is to be understood that these drawings are for the purpose of example only, and that the invention is not limited thereto.

In the drawings:

FIGURE 1 is a schematic view showing the use of the bypass system for a gas meter using a high pressure inlet and a gas regulator and a low pressure outlet:

FIGURE 2 is a schematic diagram of a bypass system for a gas meter using a low pressure inlet and a low pressure outlet; or when, bypassing the service regulator is not desired:

FIGURE 3 is a view in elevation of the high pressure test plug and cap;

FIGURE 4 is a bottom plan view of the test plug;

FIGURE 5 is a view in vertical section of the test plug in a female fitting provided on a gas line;

FIGURE 6 is a top plan view of a probe valve and fitting for use with a high pressure test plug;

FIGURE 7 is a view in section taken on the line 7—7 of FIGURE 6;

FIGURE 8 is a fragmentary view in elevation showing the connection of the probe valve fitting to a pressure gauge and test plug; and FIGURE 9 is a view partially in vertical section and partially in full lines showing the insertion of the low pressure insertion probe in a special fitting employed with the gas meter.

The high pressure test plug of this invention is generally referred to by the reference numeral 20 and is best shown in FIGURES 3–5. It is used with a female threaded fitting 22, secured over an opening 24 in a gas line 26.

The test plug 20 is comprised of a metal valve holder 28 having a hexagonal top portion 30, and a threaded upper portion 32, and a threaded lower portion 34. The lower portion is adapated to be screwed into the female opening, while the top portion 32 is adapted to be covered by a cap 36. The valve holder has an opening which has two stepped portions 38 and 40 separated by a shoulder 42. Within this opening is received a resilient rubber core 44 having a tapered top opening 46 to provide for ready insertion of a probe and a pierced opening 48. The opening 48 is under both diametrical compression and longitudinal compression provided in part by a lock element 50 fitting within the opening 40 of the valve holder. The rubber core 44 has a slightly larger external diameter than the valve holder openings 38 and 40, respectively, in order that it may be fitted within the valve holder under compression to close the opening 48 against any high pressure fluid passage until the probe is inserted through the valve core.

The cap 36 is further provided with a gasket 52 at the top. Thus, when the cap is firmly screwed down on top of the valve holder the gasket will prevent any possible leakage that might conceivably tend to pass through the rubber valve 44 from escaping through the cap itself.

The probe valve fixture is best shown in FIGURES 6 and 7. As there shown, it comprises an inflation needle and valve 54 of conventional construction and of the type used in inflating pneumatic footballs, basketballs, and the like. The needle or probe is secured to an adapter 56 having an opening which communicates with a pressure gauge socket 58 having a threaded tapered internal opening 60.

FIGURE 8 shows the connection of the probe needle to a pressure gauge 62, and the insertion of the probe needle with the pressure gauge, into the test plug. The probe passes through the rubber core of the valve and, by means of the opening 55 in the probe, communication is established for the fluid under pressure to flow through the valve and the probe into the pressure gauge.

The pressure fitting for use with the low pressure insertion probe valve is best shown in FIGURE 9. As there shown, a special fitting 66 is provided in the general form of a T. In this fitting there is an inlet 68 which is adapted to be connected to piping leading to the exhaust side of the gas meter, and which communicates with a valve chamber 70 in fitting. An exhaust opening 72 communicates with the valve chamber and has a threaded opening adapted to be connected to the outlet line. A wall 74 separates the meter inlet 68 and the valve chamber 70, and is provided with an O-ring to seal the insertion probe needle as will appear further hereinbelow. The top of the fitting 66 has a threaded opening 76 adapted to receive a threaded cap when the probe valve is not employed. The opening 76 further receives a rubber valve, generally indicated by the reference numeral 78. This valve has a hemispherical bead 80 built into it to provide a seal when the probe is first inserted in the valve. It is further provided with a hemispherical valve, lower end portion 82, which has a slit cut across the end constituting a valve opening. The valve, being made of rubber, is flexed so that when the probe is not inserted, the hemispherical end portion 82 closes and does not permit the gas to escape, since it is at quite low pressure, in the order of a few ounces of pressure.

The low pressure probe is generally indicated by the reference numeral 84 in FIGURE 9. As there shown, it is comprised of a tubular probe of suitable internal and external diameter having hemispherical end portion 86, which is imperforate. Situated above the end portion is a zone of perforations 88, which communicates with the main valve chamber 70 of the special fitting when the insertion probe is properly emplaced. A limiting stop member in the form of a flange 90 is provided at the top portion of the probe which rests on top of the fitting opening 76 to insure proper positioning of the inserted probe. As seen in FIGURE 9, when the inserted probe is properly emplaced, the lower end 86 blocks off flow between the fitting valve chamber 70 and the fitting inlet 68 leading to the gas meter, while opening flow through the inserted probe and its connected tubing through the zone of perforations 88 to the valve chamber and the fitting outlet 72.

The bypass system for connection to a gas meter having a high pressure inlet and gas regulator for regulating the gas pressure to a lower pressure leading into the gas meter is shown in FIGURE 1. In this system a high pressure inlet line is shown by the reference numeral 100 provided with a probe valve and plug of this invention which communicates with a gas valve 102 and a gas pressure regulator 104. The low pressure outlet line 106 leading from the gas pressure regulator is connected to a conventional gas meter 108 having an outlet line 110 communicating with the special fitting 66 of this invention and to which is connected an outlet line 112. The bypass system itself is comprised of a probe valve 54 connected to tubing 114 in which is inserted another conventional gas pressure regulator 116, and a conventional gas pressure gauge 118. The outlet end of the tubing is connected to the low pressure insertion probe valve 84 of this invention.

The bypass system of this invention employed in a gas meter being supplied with low pressure gas is shown in FIGURE 2. As there shown, a low pressure gas inlet 106 feeds into the special low pressure gas fitting 66 of this invention, which is connected in turn to the inlet side of a conventional gas meter 108. The outlet line 110 of the gas meter likewise is connected to the low pressure special fitting 66, which in turn is connected to an outlet line 112. The low pressure bypass line is comprised of a first low pressure insertion probe valve 84 connected by tubing 114 to a conventional gas pressure gauge 118 and a second low pressure insertion probe 84.

USE

The high pressure test plug of this invention is very simply employed. The socket 22 can be welded, tapped or otherwise connected into any suitable gas line or pressure conditions within the gas line in the order of it has been inserted the test plug is screwed into it tightly by a wrench, or the like, fitted around the hexagonal sides of the top portion 30. When the test plug is not in use, the cap 36 is drawn tightly down over the top of the plug with the gasket 52 serving to prevent any possibility of leakage. It will be understood that the rubber core 44 of the test plug is under both diametrical and longitudinal compression, and this of itself will prevent any leakage even under high fluid pressure conditions within the gas line in the order of up to about 2,000 pounds per square inch. When it is desired to take a pressure reading by means of a pressure gauge, the needle probe valve adapter is employed. The pressure gauge 62 is attached to the probe and the test plug cap is removed. The probe and the connected gauge is then simply inserted and a pressure reading is taken. It will be understood that the test plug probe valve may also be used for the insertion of fluids under pressure through the probe, or, where desired, evacuation of the fluid line may be accomplished through the valve and probe.

The test plug, valve and probe, accordingly, serve a very useful purpose in providing a simple and convenient access for pressure measurements or evacuation or introduction of fluid to the gas line. Further, by means of the gas cap over the test plug, tampering is avoided.

The bypass system for gas meters using a high pressure inlet line and gas regulator, as shown in FIGURE 1, is likewise very simply adapted to be used. When a gas meter, such as the meter 108 shown in FIGURE 1, is desired to be taken out of service, or the gas pressure regulator is desired to be inspected, the needle probe valve 54, connected to the bypass conduit 114, is inserted in the pressure test plug 20 in the inlet line 100, together with the introduction of the low pressure insertion probe valve 84 in the special fitting 66 on the outlet side of the gas meter. After this has been effected, the main valve 102 can be closed and the gas meter and the gas regulator removed from service, as desired. The entire operation can be carried out without the necessity of turning off gas appliances, since there is a continuous flow through the bypass line. When the low pressure insertion needle probe valve is inserted the outlet line 110 from the gas meter is blocked off through the end 86 of the low pressure probe needle which forms a seal with the O-ring in the special fitting. When the low pressure probe valve has been properly inserted, there will be communication through the conduit 114 through the low pressure insertion needle probe 84 and the perforated zone 88 into the valve chamber 70 of the fitting, and then through the fitting outlet 72 to the outlet line. The gas pressure regulator 116 operates in the same fashion as the gas pressure regulator in the main line, namely to regulate the high pressure inlet fluid from the pressure in the order of pounds down to a pressure in the order of ounces, as is conventional in the gas industry. The gas gauge 118 serves to indicate the pressure so that the operator knows that the bypass system is in proper operation.

When the gas system utilizes, from a gas main, low pressure gas in the order of ounces, the bypass system shown in FIGURE 2 is employed. In this system there are two special fittings employed, these being shown as the special fitting 66 on the inlet side of the gas meter and a second identical fitting 66 on the outlet side. It will be understood that these fittings are normally closed by caps, and when the bypass system is desired to be employed these caps are removed. When this has been accomplished, the low pressure insertion probes on the inlet and outlet side of the conduit 114 are inserted into the special fittings in the inlet line 106 and the outlet line 112. The low pressure insertion probe needle will open the hemispherical rubber valve 82 and, as previously described for the system in FIGURE 1, the flow will be cut off through the meter and established directly through the bypass system.

Various changes and modifications may be made within this invention. Such changes and modifications will be readily apparent to those skilled in the art in accordance with the teachings of the invention herein, and are within the scope of this invention as defined by the claims appended hereto.

What is claimed is:

1. A plug device for gas lines comprising a plug means provided in a gas line, said plug means having a resilient core having compressible opening adapted to receive a needle valve, said compressible opening being normally closed, and said needle valve being receivable within said compressible opening to provide communication from the interior of said line through the needle valve, said resilient core being receivable within a metallic housing holding said core in diametrical and longitudinal compression to close a slit like needle valve opening in the center of said core until the needle valve is inserted, said core being press fitted into an opening in the housing receiving said core, and said housing having means to restrain the top and bottom ends of said core comprising a shoulder at the top of said housing restraining the top of the core and an adjustable lock element at the bottom of said housing compressibly engageable with the bottom of said core, said core being further provided with reduced and expanded cylindrical wall portions separated by a tapered shoulder engageable within a like configuration in said housing opening, said tapered shoulder in said housing expanding toward the adjustable lock element whereby when the lock element presses the core tapered shoulder against the housing tapered shoulder, the core is compressed radially inwardly closing the compressible opening.

2. A plug device for gas lines comprising a plug means provided in a gas line, said plug means having a resilient core having compressible opening adapted to receive a needle valve, said compressible opening being normally closed, and said needle valve being receivable within said compressible opening to provide communication from the interior of said line through the needle valve, said resilient core being receivable within a metallic housing holding said core in diametrical and longitudinal compression to close a slit like needle valve opening in the center of said core until the needle valve is inserted, said core being press fitted into an opening in the housing receiving said core, and said housing having means to restrain the top and bottom ends of said core comprising a shoulder at the top of said housing restraining the top of the core and an adjustable lock element at the bottom of said housing compressibly engageable with the bottom of said core, said core being further provided with reduced and expanded cylindrical wall portions separated by a tapered shoulder engageable within a like configuration in said housing opening, said tapered shoulder in said housing expanding toward the adjustable lock element whereby when the lock element presses the core tapered shoulder against the housing tapered shoulder, the core is compressed radially inwardly closing the compressible opening, said housing having a threaded bottom end receivable in a socket attached to said gas line and a threaded top end receiving a closure cap.

3. A plug device for gas lines comprising a plug means provided in a gas line, said plug means having a resilient core having compressible opening adapted to receive a needle valve, said compressible opening being normally closed, and said needle valve being receivable within said compressible opening to provide communication from the interior of said line through the needle valve, said resilient core being receivable within a metallic housing holding said core in a diametrical and longitudinal compression to close a slit like needle valve opening in the center of said core until the needle valve is inserted, said core being press fitted into an opening in the housing receiving said core, and said housing having means to restrain the top and bottom ends of said core comprising a shoulder at the top of said housing restraining the top of the core and an adjustable lock element at the bottom of said housing compressibly engageable with the bottom of said core, said core being further provided with reduced and expanded cylindrical wall portions separated by a tapered shoulder engageable within a like configuration in said housing opening, said tapered shoulder in said housing expanding toward the adjustable lock element whereby when the lock element presses the core tapered shoulder against the housing tapered shoulder, the core is compressed radially inwardly closing the compressible opening, said housing having a threaded bottom end receivable in a socket attached to said gas line and a threaded top end receiving a closure cap, said needle valve being connected to a needle valve adapter comprising a threaded conduit connected to a socket, said socket being internally threaded and receiving a pressure gauge having a threaded nipple.

4. A device for bypassing a gas meter to prevent interruption in service when the meter is to be taken out of service, said device comprising a plug means in a high pressure inlet line communicating with said gas meter, said plug means having a resilient core having a compressible opening adapted to receive a needle valve, said compressible opening being normally closed, and said needle valve being receivable within said compressible opening to provide communication from the interior of said line through the needle valve to a low pressure insertion needle valve receivable in a resilient valve fitting in an outlet line communicating with said gas meter, said low pressure insertion needle valve having means closing off communication of the gas meter with the outlet line while opening bypass communication with said outlet line, and said resilient valve fitting comprising a hemispherical rubber valve member having a normally closed slitted valve opening.

5. A device for bypassing a gas meter to prevent interruption in service when the meter is to be taken out of service, said device comprising a needle valve receiving means in an inlet line communicating with said gas meter, said means having a normally closed opening receiving a needle valve connected to a low pressure insertion needle valve receivable in a resilient valve fitting in an outlet line communicating with said gas meter, said low pressure insertion needle having means closing off communication of the gas meter with the outlet line while opening bypass communication with said outlet line, and said resilient valve fitting comprising a hemispherical rubber valve member having a normally closed slitted valve opening.

6. A low pressure bypass valve device for gas lines comprising a fitting having a low pressure inlet opening into a valve chamber, a low pressure outlet leading from said valve chamber and a bypass inlet opening into said valve chamber, resilient valve means normally closing said bypass inlet and a low pressure insertion needle valve receivable within said fitting, said low pressure insertion valve having means closing off the low pressure inlet while opening bypass communication through said valve chamber to the outlet, said resilient valve means comprising a hemispherical rubber valve member having a normally closed slitted valve opening.

7. A low pressure bypass valve device for gas lines comprising a fitting having a low pressure inlet opening into a valve chamber, a low pressure outlet leading from said valve chamber and a bypass inlet opening into said valve chamber, resilient valve means normally closing said bypass inlet and a low pressure insertion needle valve receivable within said fitting, said low pressure insertion valve having means closing off the low pressure inlet while opening bypass communication through said valve chamber to the outlet, said resilient valve means comprising a hemispherical rubber valve member having a normally closed slitted valve opening, said low pressure needle valve having an imperforate end adapted to seal the inlet opening of the low pressure inlet to the valve chamber and a zone of perforations communicating with said valve chamber and stop means providing for proper registry of the needle valve with said fitting.

8. A device for bypassing a gas meter to prevent interruption in service when the meter is to be taken out of service, said device comprising a plug means in a high pressure inlet line communicating with said gas meter, said plug means having a resilient core having compressible opening adapted to receive a needle valve, said compressible opening being normally closed, and said needle valve being receivable within said compressible opening to provide communication from the interior of said line through the needle valve to a low pressure insertion needle valve receivable in a resilient valve fitting in an outlet line communicating with said gas meter, said resilient core being receivable within a metallic housing holding said core in diametrical and longitudinal compression to close a slit like needle valve opening in the center of said core until the needle valve is inserted, said low pressure insertion needle valve having means closing off communication of the gas meter with the outlet line while opening bypass communication with said outlet line, and said resilient valve fitting comprising a hemispherical rubber valve member having a normally closed slitted valve opening, and a gas pressure regulator in said bypass device.

9. A device for bypassing a gas meter to prevent interruption in service when the meter is to be taken out of service, said device comprising a plug means in a high pressure inlet line communicating with said gas meter, said plug means having a resilient core having compressible opening adapted to receive a needle valve, said compressible opening being normally closed, and said needle valve being receivable within said compressible opening to provide communication from the interior of said line through the needle valve to a low pressure insertion needle valve receivable in a fitting in an outlet line communicating with said gas meter, said resilient core being receivable within a metallic housing holding said core in diametrical and longitudinal compression to close a slit like needle valve opening in the center of said core until the needle valve is inserted, said low pressure insertion needle valve having means closing off communication of the gas meter with the outlet line while opening bypass communication with said outlet line, said fitting having a low pressure inlet opening into a valve chamber, a low pressure outlet leading from said valve chamber and a bypass inlet opening into said valve chamber, resilient valve means normally closing said bypass inlet, said resilient valve means comprising a hemispherical rubber valve member having a normally closed slitted valve opening, said resilient valve means receiving the low pressure needle valve to close off the low pressure inlet while opening bypass communication through said valve chamber to the outlet.

10. A device for bypassing a gas meter to prevent interruption in service when the meter is to be taken out of service, said device comprising a first low pressure insertion needle valve receivable in a fitting in a low pressure inlet line communicating with said gas meter, said low pressure insertion needle valve having means closing off communication of the gas meter with the inlet line while opening bypass communication with a second low pressure insertion needle valve, said second needle being receivable in a fitting in an outlet line communicating with said gas meter, said low pressure insertion needle valve having means closing off communication of the gas meter with the outlet line while opening bypass communication with said outlet line, said fitting having a low pressure inlet opening into a valve chamber, a low pressure outlet leading from said valve chamber and a bypass inlet opening into said valve chamber, resilient valve means normally closing said bypass inlet, said resilient valve means comprising a hemispherical rubber valve member having a normally closed slitted valve opening, said resilient valve means receiving the low pressure needle valve to close off the low pressure inlet while opening bypass communication through said valve chamber to the outlet.

References Cited

UNITED STATES PATENTS

| 2,618,978 | 11/1952 | Ragland | 73—420 |
| 2,731,028 | 1/1956 | McCord | 137—223 |
| 3,064,684 | 11/1962 | Hutton | 137—625.4 |
| 3,131,712 | 5/1964 | Risley et al. | 137—525.1 X |
| 3,173,295 | 3/1965 | Magleby | 73—201 |
| 3,296,861 | 1/1967 | Mueller et al. | 137—599.1 X |

FOREIGN PATENTS

| 578,876 | 7/1959 | Canada. |
| 1,256,262 | 2/1961 | France. |

WILLIAM F. O'DEA, *Primary Examiner.*

D. H. LAMBERT, *Assistant Examiner.*

U.S. Cl. X.R.

73—420; 137—317; 251—149.7